United States Patent [19]

Marrelli

[11] Patent Number: 5,597,961
[45] Date of Patent: Jan. 28, 1997

[54] TWO AND THREE PHASE FLOW METERING WITH A WATER CUT MONITOR AND AN ORIFICE PLATE

[75] Inventor: John D. Marrelli, Houston, Tex.

[73] Assignee: Texaco, Inc., White Plains, N.Y.

[21] Appl. No.: 490,795

[22] Filed: Jun. 15, 1995

Related U.S. Application Data

[63] Continuation-in-part of Ser. No. 266,067, Jun. 27, 1994, abandoned.

[51] Int. Cl.$^6$ ........................................................ G01F 5/00
[52] U.S. Cl. ........................................ 73/861.04; 73/61.44
[58] Field of Search ............................... 73/861.04, 23.24, 73/23.28, 61.64, 61.67, 61.73, 61.44; 324/640

[56] References Cited

U.S. PATENT DOCUMENTS

| | | | |
|---|---|---|---|
| 4,499,418 | 2/1985 | Helms et al. | 324/637 |
| 4,660,414 | 4/1987 | Hatton et al. | 73/61.44 |
| 4,891,969 | 1/1990 | Wayland et al. | 73/61.44 |
| 4,947,127 | 8/1990 | Helms et al. | 324/640 |
| 5,001,434 | 3/1991 | Marrelli et al. | 324/640 |
| 5,048,348 | 9/1991 | Durrett et al. | 73/861.04 |
| 5,127,272 | 7/1992 | Dean et al. | 73/861.04 |
| 5,195,380 | 3/1993 | Hatton et al. | 73/861.04 |
| 5,259,239 | 11/1993 | Gaisford | 73/861.04 |
| 5,390,547 | 2/1995 | Liu | 73/861.04 |
| 5,461,930 | 10/1995 | Farchi et al. | 73/861.04 |

Primary Examiner—Richard Chilcot
Assistant Examiner—Harshad Patel
Attorney, Agent, or Firm—Kenneth R. Priem; Harold J. Delhommer; James L. Bailey

[57] ABSTRACT

A three phase meter to measure the oil/water/gas fractions of a multi-phase fluid flow uses a fraction meter and a flow meter to calibrate flow with the fraction meter sending mixture density information to the flow meter to make the calculation.

4 Claims, 1 Drawing Sheet

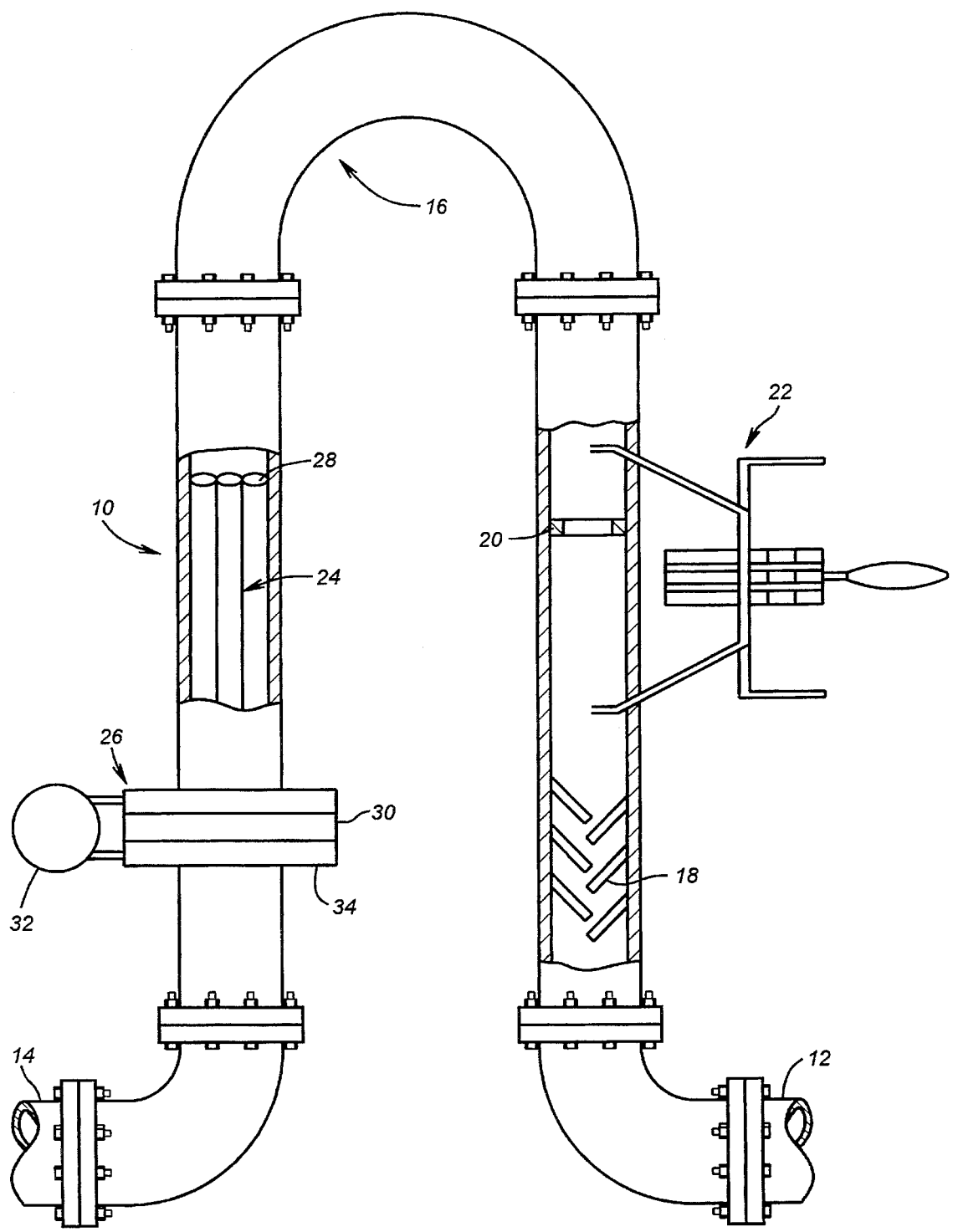

TWO AND THREE PHASE FLOW METERING WITH A WATER CUT MONITOR AND AN ORIFICE PLATE

This application is a continuation-in-part of application Ser. No. 08/266,067 filed Jun. 27, 1994 now abandoned.

BACKGROUND OF THE INVENTION

1. The Field of the Invention

The present invention constitutes an improvement over prior water cut monitors in that it provides oil, water and gas volume flow rates. In particular, a three phase flow water cut monitor is used in series with a volume flow meter and corrects the flow meter by using the water cut monitor three phase flow fluid data.

2. The Prior Art

There are a great many application where a three phase volume flow meter, which does not require separation of the fluids, will be of significant economic value. Gas (and therefore 3-phase flow) is present to some extent in virtually all live crude oil handling operations. Particular problems can arise in some situations, such as in offshore, unmanned, primary wellhead production situations where no gas is expected initially. Gas will eventually be produced as it comes out of solution with the water and oil in crude oil due to pipeline pressure drops and with aging of the reservoir. It is important to monitor the production of this gas as well as the rate of increase in gas production.

SUMMARY OF THE INVENTION

The present invention utilizes a three phase flow water cut monitor which is capable of measuring gas fraction, as well as liquid water-to-oil ratio, in combination with a flow metering device, such as an orifice plate and a differential pressure meter. A suitable water cut monitor for use in the subject system is the TEXACO STARCUT® monitor. This system is shown in detail in U.S. Pat. Nos. 4,499,418 and 4,947,127 which are incorporated herein by reference for all purposes. The subject system preferably also includes appropriate static flow mixing means upstream of the water cut monitor and flow straightening means upstream of the flow metering device.

BRIEF DESCRIPTION OF THE DRAWINGS

The present invention will now be described, by way of example, with reference to the accompanying drawings, in which the single figure is a schematic diagram a low gas embodiment of a water cut monitor system according to the present invention.

DETAILED DESCRIPTION OF THE PREFERRED EMBODIMENT

The subject three phase water cut monitor is used in combination, either in series or in parallel, with a flow metering device which can be designed to be used with a single phase fluid, such as water, oil or gas. The single phase meter may comprises known flow meter which will function better if the composition of the mixture passing through the meter is known. The present invention will be discussed, by way of example, using a TEXACO STARCUT® monitor capable of measuring these phase flow by techniques as discussed in co-pending U.S. application Ser. No. 08/228, 614 filed Apr. 15, 1994 or the like, in combination with a single phase flow metering device of the type having an orifice plate and a differential pressure meter. The particular example illustrated is a series connected low gas system content with fluid mixing and flow straightening appropriately included. The present invention is suitable for use in either high or low gas situations, even though illustrative for example with a low gas cut monitor here. For use with high gas cuts (greater than 50%) systems using "INCLINE" piping such as shown in U.S. Pat. No. 5,048,348; 5,127,272 or 5,195,380 may be used.

Turning now to the FIGURE, the subject system 10 is connected between inlet pipe 12 and outlet pipe 14 and generally comprises an inverted U shaped pipe 16. A static mixer 18 is fixed in one leg of pipe 16 adjacent the inlet pipe 12 and an orifice plate 20 is spaced downstream of the mixer. A water cut monitor 22 of TEXACO STARCUT® design is connected across the orifice plate 20, the purpose of which is to create a pressure drop forcing fluid to flow through the water cut monitor 22. A flow straightener 24 and a differential flow meter 26 are fixed in the other leg of pipe 16. The flow straightener 24 can be an assembly of straight pipes 28. The flow meter 26 comprises an orifice plate 30 and a differential pressure meter 32 spanning the orifice plate.

Although detailed in the aforementioned co-pending U.S. application Ser. No. 08/228,614 filed Apr. 15, 1994, the operation of the TEXACO STARCUT® monitor used to obtain water fraction, oil fraction and gas fraction will be repeated here for clarity. This system's detection of the gas fraction flowing in a typically liquid (oil and water)crude oil stream is based on statistical variations occurring in the measured values of oil and water fractions caused by the flow of gas bubbles through the device.

The gas fraction in the fluid is determined using 'on-line' statistical methods, detailed below, and then using that fraction to compute the correct water fraction. The STARCUT® three-phase water fraction monitor 22 of the FIGURE includes the following:

1. Gas fraction ($X_g$) is detected by using the statistical standard deviation of the raw phase (Pstd), maximum phase in the sampling interval (Pmax), average phase (pavg) or statistical standard deviation of attenuation (Astd) data and maximum attenuation in the sampling interval (Amax), or average attenuation (Aavg) from streams flowing in the water fraction monitor sensor cell where, for the condition stated:

Gas Fraction

Case 1: $X_g = K_1 * Pstd$;

Case 2: $X_g = K_2 * Astd$;

Case 3: $X_g = K_3 * Pstd/Pavg$, normalized by the amount of water;

Case 4: $X_g = K_4 * Astd/Aavg$, normalized by the amount of water and not sensitive to errors in wavelength.

Case 5: $X_g = K_5 * Pstd/Pmax$, normalized by maximum water fraction in data set;

Case 6: $X_g = K_6 \, Astd/Amax$, normalized by maximum water fraction in data set but not sensitive to errors in wavelength;

Case 7: $X_g = K_5 * (Pmax - Pavg)/Pmax$, a form of standard derivation, but useful when data sets are small;

Case 8: $X_g = K_6 * (Amax - Aavg)/Amax$, a form of standard derivation, but useful when data sets are small and not sensitive to wavelength errors;

Case 9: $X_g = [K_7 * EXP(Pavg/K_9)] * Pstd$, improved fit for the curve of Case 5;

Case 10: $X_g = [K_{10} * K_{22} * EXP(Aavg/K_{12})] * Astd$, improved fit for the curve of Case 6;

Case 11: $X_g=f(Astd,Pstd,Amax,Pmax,Aavg,Pmax)$, general relationship recognizing that $X_g$ is a function of all parameters.

All of the above cases have validity under some or all of the operating conditions in the above mentioned STARCUT® monitor. Software detects appropriate conditions and selects the gas fraction equation for those conditions. See case selection below.

2. Water fraction measurement (the ratio of water volume to total liquid measure) has been made insensitive to gas fraction using the following equation:

$$\text{WATER FRACTION} = X_w/\{1-X_g\}$$

where $X_w$=Water Fraction

A water fraction monitor incorporating the above measures will be substantially insensitive to the gas fraction of a three phase fluid mixture.

Discussion of CASES of equation validity:
a. Small gas fraction less than 5%
   CASES 1 and 2
b. Gas fraction calculation are weighted by water fraction
   CASES 3, 4, 5, 6, 7, 8, 9, 10, 11
c. Pure Liquid properties are inferred from Maximum data in sampling interval
   CASES 5, 6, 7, 8
d. Low water fraction
   CASES 1, 2, 9, 10, 11
e. High water fraction
   CASES 1, 2, 3, 4, 5, 6, 7, 8, 9, 10, 11
f. If there is a possibility of making errors in, i.e., the number of wavelengths passing through the sample, logical phase shifter circle selection, phase dependent methods of gas detection should not be used. Use:
   CASES 2, 4, 6, 8, 10, 11
g. High Gas Fraction
   CASES 9, 10, 11

The accuracy of the subject instrument is greatly enhanced if the fluids are well mixed and the relative velocity of the individual components are approximately the same. A side stream version of a known water cut monitor, such as the one described in U.S. Pat. No. 5,001,434, the disclosure of which is incorporated herein by reference, is recommended for use in low gas situations (defined as less than 50% gas by volume at the pressure of the measurement or whenever the liquid is the continuous phase).

When the gas fraction is greater than 50%, or whenever the gas is in the continuous phase, then "Incline" type piping, such as that described in U.S. Pat. Nos. 5,048,348; 5,127,272; and 5,195,380, the disclosure of which are incorporated herein by reference, is recommended.

Field testing has revealed three types of flow conditions which are not easily detectable by the operators.

1. Free gas is generally present in all production facilities, including the liquid leg of two-phase separators.

2. Water fraction may change back and forth from 0% to 100% oil or water several times in a few minutes due to separation of oil and water in the pipeline as it flows from the well head. This slugging effect is often present, to some degree, in offshore wells.

3. Leaking manifold valves cause well tests to be inaccurate due to co-mingled flow from other wells. Co-mingled flow can be identified by a change in water salinity, as detected by the subject monitor. Because free gas, slugging and co-mingling of fluids could reduce the accuracy of metering equipment, considerable effort has been applied to studies of the effects of microwave transmission on mixtures of gas, oil and salt water and the detection of rapidly changing events. The subject monitor's auto-calibration capability, detection speed (>300 samples/second) and immunity to the effects of free gas and salinity changes has been enhanced by electronic improvements, computer upgrade and improved algorithms incorporating increased knowledge of gas/liquid dielectric properties. As a consequence of these improvements, mixtures of fluids containing gas content variations from 0% to 25%, salinity changes from fresh water to 50,000 parts/million of salts, and rapid slugging between oil and water, may be monitored without significant reduction in the accuracy of water fraction readings. Salinity and API gravity estimates for the water and oil components improve with time and may be continuously read from current loop outputs or from computer generated graphics resident in the control room.

The wide variety of oil reservoirs and production conditions precludes selection of a "standard set" of expectable properties as design parameters. An effective water fraction instrument should have the capability to automatically adapt to a wide range of conditions. The subject meter was developed to provide this automatic adaptation to changing conditions as well as to improve on the accuracy of traditional methods of water fraction determination. When long pipelines show slugging behavior, that is, rapid and large swings in water fraction, crude oil and brine production can vary between oil-continuous and water-continuous emulsions, in some cases as often as once per minute. Instrument calibrations dependent on the assumption that the fluids are always oil continuous, such as capacitance meters, therefore, have a high probability of error in such cases. Other types of water cut instruments, which depend on knowing the density of the production component fluids, are extremely sensitive to the presence of free gas. Field conditions such as variable temperature, salinity, and crude oil gravity or density also contribute significantly to error in traditional methods of water cut measurement. The design of the subject meter assumed that measurement of oil-water ratio in production systems requires determining as many of the parameters of the production fluids as is necessary to accurately specify the water fraction. These parameters are water salinity, crude oil gravity, temperature and free gas fraction. A frequency of approximately 10,000 mega Hertz was chosen as the frequency likely to provide the most information about the fluids through which it is transmitted. The technology underlying the development of this meter may be separated into three general areas:

1) Electronic Design
2) Fluid Property Analysis; and
3) Automatic Calibration.

A sampling system has been developed which ensures that a representative sample is continuously provided to the monitor regardless of conditions of the flow. These sampling systems are described elsewhere.

The sensor element is machined from a solid bar of inconel steel, acts as a precision tolerance, high pressure, microwave waveguide which channels and shapes the transmitted microwave energy as it passes through the crude oil stream. The sensor cell is mounted to the side of an explosion proof enclosure which contains all of the electronics, including a miniature 386 microcomputer. The sensor cell includes an oil and temperature resistant dielectric material embedded in the steel to fill part of the waveguide and determine the calibration properties of the sensor. The sensor is also connected to a pipeline side stream sampling system by way of a 3-way valve. The 3-way valve provides opportunity to verify system accuracy by allowing the trapping of fluids for analysis as they pass through the sensor. The objective of the electronic system is to accurately deliver a microwave signal to the sensor waveguides and measure the change in properties of the microwave signal after it has been transmitted through the live oil stream. This signal is then compared to a similarly treated signal passed through a reference fluid held in a cell in the same inconel block and at the same temperature of the crude by its proximity to the flow lines. The electronic detection is achieved with methods of differential recording which minimize error due to noise or internal drift. Simultaneous electrical measurement of two effects of dielectric properties of the production, attenuation and phase shift, allow considerable enhancement of the monitor's ability to detect and compensate for the effects of rapidly varying gas bubble flow. Further compensation of electronic drift is provided by computer-based calibration curves for those electronic components which have shown special sensitivity to operation temperature of the electronics. In some field installations, the electronic enclosure may experience a 40° F. temperature change during one day. The monitor operation is controlled by a miniature, industrially hardened microcomputer packaged with the sensor in a single compact unit installed at the pipeline site.

Microwave transmission through space is governed by the complex dielectric permitivity of the medium. The properties of the three mixture components, oil, water and gas, their proportions and way in which they are mixed determine the mixture dielectric. The complex dielectric of the medium controls both the attenuation of the transmitted signal and the velocity of transmission. In the monitor these two phenomena are measured in terms of: 1) the power transmitted through the sensor cell, referred to here as attenuation in decibels; and 2) the change in phase shift of the received sinusoidally oscillating wave relative to a stable fluid reference, referred to here as phase shift measured in degrees. Both measurements are made relative to similar measurements of a highly stable calibration fluid sealed within the inconel sensor block. Values of attenuation and phase shift are also dependent on the sensor geometry. While it is possible to convert the relative attenuation and relative phase shift to the complete dielectric, a measure independent of sensor geometry, that information has not been presented here as it is not directly related to the detection of water fraction. Study of the chemical properties of fluids is divided into properties of non-polar liquids (oils) alone, polar liquids (brine) alone, gases and mixtures of polar, non-polar fluids and gases.

All functions of the subject water fraction monitor depend on microwave attenuation and phase shift data, some stored in computer memory and some automatically collected during operation in the field. The standard method used for water fraction monitor prediction depends on laboratory data stored in the monitor's memory. The present invention assumes that no matter how much gas is in the production fluid, some gas-free liquid samples will pass through the sensor. As low gas samples eventually pass the sensor, the monitors estimation of the correct density and salinity will converge to minimum values which will be correct and also provide the best estimate of the liquid curves from which water fraction is determined. In several minutes, thousands of data points are accumulated and evaluated searching for the best estimates of the production curves. At operator selected intervals, depending on well test schedules and which can vary from hours to days, accumulated data is discarded and new search for the correct curves is initiated to allow new wells with different properties to be automatically evaluated.

The gas-free analysis depends on the observation in laboratory and field that regardless of gas fraction some of the production flowing pass the sensor will contain gas-free samples. Furthermore, since the all-liquid lines are defined now on the cross-plot, estimates of gas fraction are made by the distance of data points from the liquid lines. This estimate is less precise with greater deviation from the liquid line. Once the cross-plot curves are generated, decision criteria are set up by creating a line connecting the 100% water and 100% oil cross-plot points, to determine if subsequent data is from oil or water-continuous fluids. Finally, using the decision curve, the proper water fraction versus phase calibration curve is chosen and water fraction is read. The gas fraction is then determined by the statistical variation from the liquid curves of individual measurement data. The output of the device, in this example, is then an oil fraction, a water fraction and a gas fraction as computed in real time by the Intel 80386 based internal processor in the monitor.

The output of the water cut monitor 22 provides water fraction, oil fraction and gas fraction of the fluids about to pass through the flow metering device 26. In the present instance the water cut monitor 22 provides water cut and gas fraction data which allows computation of the average density of the fluid mixture passing through the flow meter 26 given the known densities of oil, water and gas. In the present example the flow meter 26 is a known orifice meter consisting of a pipe line flow tube and an orifice plate 30 mounted in a Daniels Simplex junior plate holder 34, such as manufactured by Daniels Industry Inc. of Houston, Tex. The differential pressure across the orifice plate is monitored using a known differential pressure meter 31.

The standard orifice plate equation is:

$$\text{Volumetric Flow rate} = k * \frac{(\rho * d_p)^{.5}}{\rho} = Q_v$$

where:

K is a constant obtained from standard tables and equations;

$\rho$ is the density of the fluid passing through the orifice; and $d_p$ is the differential pressure across the orifice plate (measured just upstream and just downstream of the plate).

The monitor 22 provides Xg (the gas fraction), Xo (the oil fraction) and Xw (the water fraction) where:

Xg+Xo+Xw=1.0 and the fluid mixture density in the monitor is then $$\rho = X_g * \rho_{gas} + X_o * \rho_{oil} + X_w * \rho_{water}$$

where:

$\rho_{gas}$ is the gas density;

$\rho_{oil}$ is the oil density; and $\rho_{water}$ is the water density.

In practice the differential pressure meter 32 provides a current loop range (4–20 ma) output coding the differential pressure information as an analog-signal between 4 and 20 ma which is automatically read by the monitor 22 (not shown) analog to digital circuit and included with its internally calculated fractions as listed above.

The volumetric flow rate of each component is then computed by multiplying the net volumetric flow rate, (equation above) by the fluid fraction, for example $$Q_{gas}=Q_v*X_g$$

$$Q_{oil}=Q_v*X_o$$

$$Q_{water}=Q_v X_w$$

The accuracy of the instrument is greatly enhanced if the fluids are well mixed and the relative velocity of the individual components are approximately the same. This instrument is thus recommended for use in low gas situations, defined as gas less than 20% by volume at the pressure of the measurement.

The present invention may be subject to many modifications and changes which will be apparent to those skilled in the art. The present embodiment is therefore to be considered in all respects as illustrative and not restrictive of the scope of the invention as defined by the appended claims.

We claim:

1. A system for determining the volumetric flow rates of the oil/water/gas fractions of three phase fluid flow in a fluid flow line corrected for density variations, comprising:

a continuous flow water cut monitor placed in a three phase fluid flow line and capable of continuously measuring on a statistical basis and providing three separate continuous outputs representative of the oil fraction, the water fraction and the gas fraction of fluid flow in said flow line;

a total volume fluid flow meter placed in series in said fluid flow line with said water cut monitor and capable of measuring and producing a continuous output signal representative of the total volumetric flow rate of fluid in said flow line passing therethrough; and means responsive to said three separate continuous outputs of said water cut monitor and said output signal representative of the total volumetric flow rate from said flow meter for continuously determining the total density of fluid entering said flow meter and for correcting said total volumetric flow rate representative signal from said flow meter for density changes whereby the oil fraction, gas fraction and water fraction volumetric flow rates in said fluid flow line are determined.

2. The system of claim 1 and further including in series between said water cut monitor and said flow meter, flow straightening means fixed in said flow line.

3. The system of claim 2 and further including upstream of said water cut monitor and in series therewith a flow mixing means.

4. A method for determining the oil/water/gas fractions of a multi-phase fluid flow in a flow line, comprising the steps of:

providing in said flow line a water cut monitor capable of continuously measuring on a statistical basis and providing output signals representative of the oil/water/gas fractions of fluid flowing in said flow line;

providing a total fluid volume flow meter in said flow line capable of continuously measuring total fluid volume flow rote as a function of fluid density;

measuring the water fraction and gas fraction of fluid flow with said water cut monitor to continuously determine the density of the fluid flowing in said flow line;

continuously, measuring with said flow meter the differential pressure across an orifice plate of said meter;

using the continuously measured differential pressure and fluid density to determine the total volumetric flow rate; and using the continuously measured gas fraction and volumetric flow rate to continuously determine the gas flow rate.

* * * * *